Patented Oct. 16, 1923.

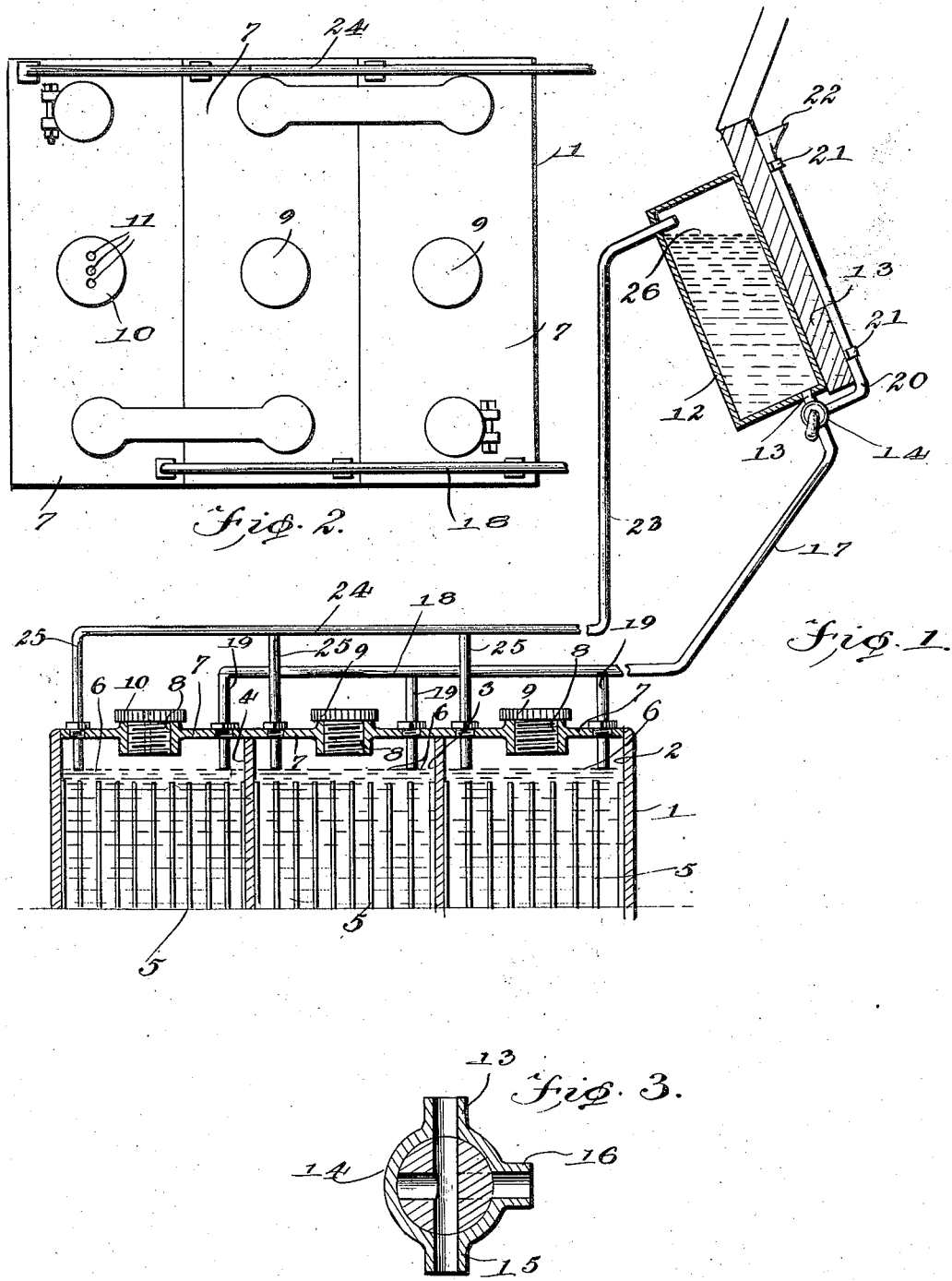

1,471,048

UNITED STATES PATENT OFFICE.

AUGUST MENGER, OF SAN ANTONIO, TEXAS.

AUTOMATIC BATTERY WATER-SUPPLYING DEVICE.

Application filed August 4, 1922. Serial No. 579,718.

*To all whom it may concern:*

Be it known that I, AUGUST MENGER, a citizen of the United States, and resident of San Antonio, in the county of Bexar and State of Texas, have invented certain new and useful Improvements in Automatic Battery Water-Supplying Devices, of which the following is a specification.

My invention is a device which is adapted to be applied to electric storage batteries of ordinary types, such as are adapted for use in automobiles, to automatically maintain the electrolyte in the several cells of a battery to which applied at a desirable level by supplying distilled water to the cells when required.

An object of the invention is to provide a device of the character described which is adapted to operate positively without in any way detrimentally affecting the battery or the parts thereof or the proper functioning of the battery in the service for which intended.

A further object of my invention is to provide a device of the character described which is adapted to be operatively applied to a storage battery of ordinary construction without preventing the filling of the cells of the battery or the inspection and testing of the electrolyte therein at intervals in the usual manner.

A still further object of my invention is to provide a device of the character described which is adapted to prevent the overfilling of or supplying of excess water to any of the cells of the battery when an abnormal condition obtains in any one of the cells of the battery, as when the electrolyte gets low therein.

A still further object of my invention is to provide in a device of the character described a reservoir or supply container which is operatively connected with the respective cells of a storage battery, and a combined fill pipe and gauge tube for the container.

A still further object of my invention is to provide a device of the character described which is simple in construction, adapted to be manufactured at a relatively low cost and to be applied easily, and which is thoroughly practical commercially.

Other objects and advantages will be apparent from the following description and the novel features of the invention will be particularly outlined in the appended claims.

A practical embodiment of my invention is illustrated in the accompanying drawings, forming a part of this application, in which—

Figure 1 is a vertical sectional view through a fragmentary portion of an electric storage battery of an automobile and through the embodiment of the invention applied thereto, Figure 2 is a plan view of the battery shown in Figure 1, showing also portions of the device connected therewith, and Figure 3 is a detail sectional view through a three-way valve comprised in the device.

Referring now to the drawings and particularly to Figures 1 and 2 thereof, the numeral 1 designates generally an electric storage battery which is of conventional construction and is shown as comprising three cells 2, 3 and 4 respectively, in which battery plates 5 and electrolyte are disposed, the level of the electrolyte being indicated at 6.

The cells of the battery have cover plates 7, each provided with a central fill opening 8. The fill openings 8 of the cells 2 and 3 are normally sealed by imperforate caps or plugs 9 in threaded engagement therewith, whereby the cells 2 and 3 are air-tight. A cap or plug 10 is in threaded engagement with the fill opening of the cell 4 and differs from the caps or plugs 9 in that it is provided with a vent opening or vent openings 11 extending therethrough longitudinally thereof.

A container 12 adapted to hold a determined quantity of distilled water, as for instance a quantity sufficient to supply water to the battery 1 when required for a considerable length of time, is positioned at a level higher than the battery, preferably being supported upon the dashboard 13 of the automobile equipped with the battery 1. A pendant nipple 13 communicating with the interior of the container 12 at a point adjacent to but not at the lowest part of the latter constitutes a portion of a three-way valve 14. The latter includes a nipple portion 15 diametrically opposite the nipple portion 13 and a nipple portion 16 extending at right angles to both the nipple portion 13 and the nipple portion 15. A delivery or supply pipe 17 is connected with the nipple 15 and leads to or is formed integrally with a manifold having a horizontal portion extending in spaced overlying relation to the cover plates of the respective cells of the battery and pendant vertical branches 19 extending through the cover plates and terminating at their lower ends at a determined level within the cells, which in the present instance is the level indicated at 6, that being the level at which it is desired to maintain electrolyte in the cells. The branches 19 are open at their lower ends and have a fluid tight fit with the cover plates 7. There is of course a branch for each cell of the battery and these branches are formed of a hard rubber, lead, or other suitable material which will not be affected by the action of the contents of the cell thereon.

A fill tube 20 connects at its lower end with the nipple 16 and extends through the dashboard 13 and then upwardly along the side of the latter proximate to the seat of the operator of the automobile in which the device is applied to a level higher than the upper end of the container 12. The fill tube 20 is secured by straps 21 to the dashboard and the portion thereof extending between the levels of the lower and upper ends of the container is made of a transparent material, such as glass, whereby the fill tube also serves as a gauge tube to indicate the level of liquid in the container 12. The fill tube 20 may terminate at its upper end in a funnel shaped portion 22 to facilitate the introduction of distilled water thereinto when it is necessary to refill the container.

The container 12 is closed to the atmosphere and a vent tube 23 leading from a manifold 24 having pendant vertical branches 25 depending through the cover plates 7 to the same level as that to which the branches 19 of the supply manifold extend communicates with the interior of the container 12 above the normal level of distilled water supply therein, which level is indicated at 26.

From the foregoing description of the various parts of the device the operation thereof may be readily understood. The level of the electrolyte being as indicated in Figure 1, the ends of the branches 19 and 25 will be submerged and sealed, whereby water will not flow from the container 12 into the respective cells. However, when the electrolyte in one or more of the cells falls below the level indicated, the seal will be broken and air will pass from above the electrolyte in the cell or cells through the vent pipe 23 and water will flow from the container 12 into the cell or cells until the level of the electrolyte therein is as indicated in the drawings.

The branches 19 and 25 will then again be sealed and no amount of oscillation or vibration of the battery or of the parts on which the battery is supported will result in the breaking of the seal so long as the indicated level of the electrolyte is maintained.

When it is desired to refill the container 12, the three-way valve, which is normally in the position in which illustrated in Figure 3 (operating position) is operated to prevent communication between the nipple 13 and the nipple 15 and to establish communication between the nipple 16 and the nipple 13, by rotating the valve member one-fourth revolution in a clockwise direction from the operating position in which illustrated in full lines in Figure 3 to a filling position as indicated by the dotted lines in the same figure.

The caps or plugs 9 closing the fill openings of the cells 2 and 3 are imperforate so that flooding of these cells will not result when the air seal in cell 4 is broken, as would occur were the caps or plugs 9 perforated. In the event that gases form in the cells 2 and 3 because of these cells being overcharged or for any other cause, the gas may force its way into the branches 25 depending into the cells 2 and 3, through the horizontal portion of the manifold 24 and the remaining branch 25 into the cell 4, and thence through the vent openings 11.

It will thus be apparent that by the use of my device a constant level of electrolyte within the cells will be maintained automatically without requiring any attention on the part of the operator after once being placed in condition to operate and that the device does not in any way interfere with the functioning of the battery in the usual manner. The plugs 9 and 10 may be removed when desired to permit inspection of electrolyte in the cells or the testing of such electrolyte in the usual manner.

Obviously, my invention is susceptible of embodiment in forms other than that disclosed herein without departing from the spirit and scope of the invention and I therefore consider as my own all modifications and adaptations thereof which fairly fall within the scope of the appended claims.

I claim:—

1. The combination with an electric storage battery comprising a plurality of cells, each having a cover plate provided with a fill opening and a cap normally closing the fill opening, of a container for liquid positioned above the level of the upper ends of the cells, a liquid supply conduit including a three-way valve at the upper end thereof and in communication with the interior of the container at the lower end of the latter, said conduit including as its lower part a manifold having a plurality of pendant branches, there being a branch for each of said cells and each of said branches being open at its lower end, said branches being arranged to depend through the cover portions of the cells into the latter and to terminate at their lower ends at a determined level within the cells, an air conduit having a lower end portion formed as a manifold having pendant branches open at their lower ends and depending through the covers of the cells to terminate at their lower ends at the level of the lower ends of the branches of said liquid supply manifold, said air conduit being arranged to communicate at its upper end with the interior of the container above the normal level of a liquid in the latter, and a fill tube communicating at its lower end with said three way valve, and being open at its upper end, said fill tube having a portion thereof extending between the planes of the lower and upper ends of the container and being formed of a transparent material, whereby the level of a liquid in the container will be indicated in the fill tube.

2. In combination, an electric storage battery comprising a plurality of cells arranged in series, each of said cells being provided with a cover plate having an air tight connection therewith, each cover plate having a fill opening and a removable closure for the fill opening, the closure for the fill opening of the cell at one end of the series being provided with a vent and the remaining closures being imperforate and having an air tight fit with their respective fill openings, a container for liquid positioned above the level of the upper ends of the cells, a liquid supply conduit in communication at its upper end with the lower part of the container and including as its lower part a manifold having a plurality of pendant branches open at their lower ends and arranged to depend through the cover plates of the cells to terminate at their lower ends at a determined level within the cells, there being a branch of the manifold for each cell and said manifold being arranged so that the branch thereof remote from the container depends within the cell provided with the vented closure, and an air conduit having a lower end portion formed as a manifold having pendant branches depending through the cover plates of the cells to terminate at their lower ends at a level not lower than that of the lower ends of the branches of the liquid conducting manifold, said air conduit communicating at its upper end with the interior of the container above the level of the liquid in the latter, the container being air tight.

AUGUST MENGER.